(12) United States Patent
Shafir et al.

(10) Patent No.: US 7,057,532 B2
(45) Date of Patent: Jun. 6, 2006

(54) ROAD SAFETY WARNING SYSTEM AND METHOD

(75) Inventors: Michael Shafir, Kiryat Ono (IL); Yossef Shiri, 1 Haerez Street, Ashdod 77267 (IL)

(73) Assignee: Yossef Shiri, Ashdod (IL)

( * ) Notice: Subject to any disclaimer, the term of this patent is extended or adjusted under 35 U.S.C. 154(b) by 91 days.

(21) Appl. No.: 10/684,489

(22) Filed: Oct. 15, 2003

(65) Prior Publication Data
US 2005/0083211 A1   Apr. 21, 2005

(51) Int. Cl.
*G08G 1/123*   (2006.01)

(52) U.S. Cl. .................... 340/988; 340/905; 340/995.1; 340/995.13; 340/995.19; 340/990; 340/991; 701/208; 701/209; 701/210

(58) Field of Classification Search ........... 340/988, 340/990, 903, 905, 435, 436, 438, 995.1, 340/995.12, 995.13, 995.19, 991, 439, 441, 340/466; 701/300, 301, 98, 200, 209, 210, 701/211, 1; 180/167, 168, 169
See application file for complete search history.

(56) References Cited

U.S. PATENT DOCUMENTS

| 5,982,278 | A | 11/1999 | Cuvelier |
| 6,370,475 | B1* | 4/2002 | Breed et al. ............... 701/301 |
| 6,420,997 | B1* | 7/2002 | Cong ............................ 342/70 |
| 6,487,500 | B1 | 11/2002 | Lemelson et al. |

* cited by examiner

*Primary Examiner*—Hung Nguyen
(74) *Attorney, Agent, or Firm*—Nath & Associates PLLC; Gregory B. Kang; Derek Richmond

(57) ABSTRACT

An in-vehicle system for tracking events that occur at specific locations of a transportation route and alerting a driver of an impending significant event includes a location determination unit for determining an instantaneous location of the vehicle, and an event determination unit coupled to the location determination unit and responsive to the instantaneous location of the vehicle for communicating with an events database for obtaining an impending traffic sign that the vehicle is about to confront based on the vehicle's instantaneous location. A decision module coupled to the event determination unit is responsive to current parameters of the vehicle for determining whether the current parameters of the vehicle are conducive to safe driving based on the impending event, and a warning unit coupled to the decision module is responsive to at least one current parameter of the vehicle not being conducive to safe driving for alerting the driver of the impending event.

27 Claims, 4 Drawing Sheets

ROAD SAFETY WARNING SYSTEM AND METHOD

FIELD OF THE INVENTION

This invention relates to road safety warning systems.

BACKGROUND OF THE INVENTION

Various attempts have been made in the art to address the need to provide motorists with advance information relating to hazardous road conditions in order to permit them to take defensive action and avoid accidents.

For example, U.S. Pat. No. 6,487,500 (Lemelson et al) issued Nov. 26, 2002 entitled "GPS vehicle collision avoidance warning and control system and method" discloses a GPS based location system that continuously determines a vehicle's tracking position on a pathway with centimeter accuracy. The GPS-based position is communicated with selected other status information to other vehicles in the vicinity, to a station and/or to one of a plurality of control centers, which relay to the vehicle each of the other vehicles' status information and kinematic tracking position. Objects are detected from all directions by various sensors and data are computer processed and analyzed in neural networks on-board the vehicle to identify, rank, and evaluate collision hazards/objects allowing automatic control of the vehicle.

U.S. Pat. No. 5,982,278 (Cuvelier) issued Nov. 9, 1999 and entitled "Road monitoring device" discloses a device for improving vehicle driving safety and comfort. Information relating to road markings encountered during a journey is transmitted to the vehicle, the position of the vehicle on the driving surface is continuously monitored, and the road surface is checked for the presence of foreign matter such as mud, snow, ice, etc. A set of transmitting-receiving sensors suitably arranged on the vehicle and facing the driving surface continuously observes changes in the reflective properties of the observed areas within the sensitivity range thereof. Sensors detect markings defiling lanes and shoulders lined with grassy, gravelly or sandy areas as soon as the vehicle approaches or drives over them. Signals from the sensors are processed by an electronic unit controlling an on-board signaling system linked to an alarm system for warning the driver of road hazards and possible unsafe driving, such as straying off-course, speeding, etc.

Information relating to upcoming traffic signs are conveyed to the motorist by means of suitable sensors, such as transmitters, which emit waves that are reflected off the road surface. An example is described with reference to FIG. 6 of U.S. Pat. No. 5,982,278 wherein a vehicle's speed is checked when approaching a hazardous bend. Spaced-apart sensors built into the road surface, at right angles to the road axis, detect the vehicle's presence and, based on the time difference between the vehicle passing over successive sensors, calculate the vehicle's speed. If the vehicle speed exceeds then maximum permitted speed for the location, an alarm is given prompting the motorist to take remedial action.

FIG. 7 of U.S. Pat. No. 5,982,278 shows an extension of this concept where sensors are disposed in the road surface prior to a junction so as to assess the approaching speed of the vehicle and to allow an on-board speed controller to reduce the speed commensurate with the need to stop at the junction.

Such sensors may be used to convey to the motorist information relating to traffic signs, such as STOP, but this requires that sensors be built into the road surface, requiring significant modification to the existing infrastructure.

It would therefore be desirable to provide a road safety warning system that responds to road signs for conveying warnings to a motorist whose approach speed is deemed dangerous, but without the need to modify the highway.

SUMMARY OF THE INVENTION

It is a particular object of the invention to provide an in-vehicle system for tracking road signs and alerting a motorist of an impending significant road sign without requiring modifications to the highway infrastructure.

This object is realized in accordance with a first aspect of the invention by an in-vehicle system for tracking events that occur at specific locations of a transportation route and alerting a driver of an impending significant event, the system including:

a location determination unit for determining an instantaneous location of the vehicle, an event determination unit coupled to the location determination unit and responsive to the instantaneous location of the vehicle for communicating with an events database for obtaining an impending event that the vehicle is about to confront based on said instantaneous location, a decision module coupled to the event determination unit and responsive to current parameters of the vehicle for determining whether the current parameters of the vehicle are conducive to safe driving based on said impending road sign, and a warning unit coupled to the decision module and responsive to at least one current parameter of the vehicle not being conducive to safe driving based on said impending road sign for alerting the driver of the impending event.

Such a system when applied to road transport routes may be based on a traffic sign database such as is nowadays available as standard ordnance data from the department of transport or other such equivalent government or consumer bodies. Such a database is preferably mounted inside the vehicle as part of the system so as to enable upcoming traffic signs to be determined in advance based on the vehicle's instantaneous location obtained using GPS. This requires a suitable GPS receiver but requires no modifications to the highway infrastructure.

According to a second aspect of the invention, there is provided a method for alerting a driver of an impending significant event that occurs at a specific location of a transportation route, the method including:

determining an instantaneous location of the vehicle;

accessing an events database for obtaining an impending event that the vehicle is about to confront based on said instantaneous location;

determining whether the current parameters of the vehicle are conducive to safe driving based on said impending road sign; and if at least one current parameter of the vehicle is not conducive to safe driving based on said impending road sign, alerting the driver of the impending event.

BRIEF DESCRIPTION OF THE DRAWINGS

In order to understand the invention and to see how it may be carried out in practice, a preferred embodiment will now be described, by way of non-limiting example only, with regard to a method and system for alerting a motorist of an impending significant traffic sign that occurs at a specific location of a transportation route and with reference to the accompanying drawings, in which.

DETAILED DESCRIPTION OF THE INVENTION

Figure 1:
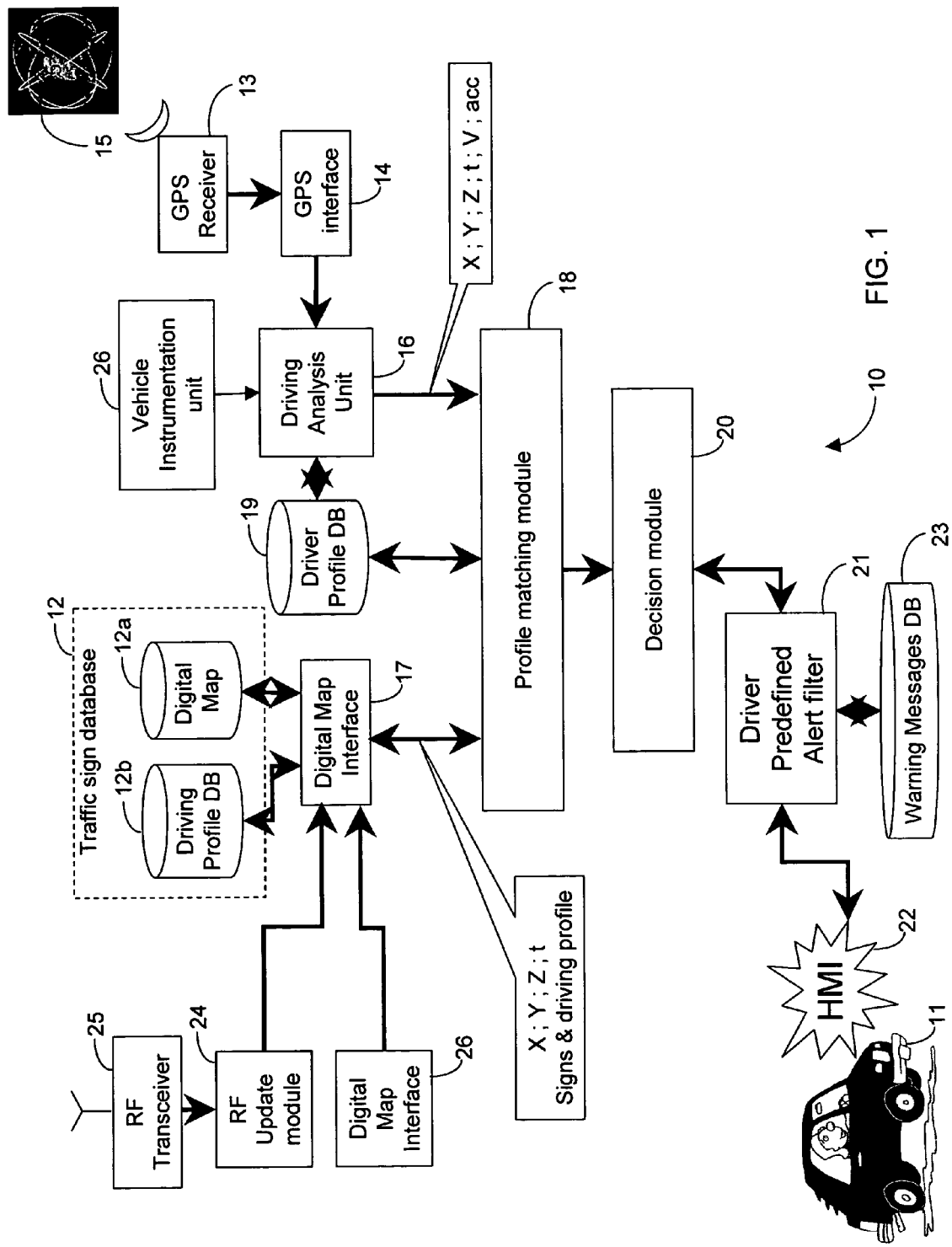
FIG. 1 is a block diagram showing functionally an in-vehicle road safety system according to the invention.

FIG. 1 shows functionally an in-vehicle road safety system 10 according to the invention that is mounted inside a vehicle 11 for tracking traffic signs and alerting a motorist of the vehicle 11 of an impending significant traffic sign. The system 10 comprises a digital map database 12 a mapping traffic signs according to their location in 3-D space. The traffic signs constitute events that occur at specific locations of a transportation route and in connection with which a driver of the vehicle may need to be forewarned. The digital map database stores (x, y, z, t) coordinates of traffic signs so as to indicate spatial and time coordinates associated therewith. The time coordinates (t) indicate any time restrictions associated with the respective traffic sign. For example, a speed limitation or a direction limitation, such as no right turn, may be effective only during certain hours of the day. Also associated with the digital map database 12a is a driving profile database 12b, which stores driving profile data pertaining to traffic signs referenced in the digital map database 12a. The digital map database 12a and the driving profile database 12b together constitute a traffic sign database 12 mapping traffic signs according to their location in 3-D space and driving profiles associated therewith as explained in lo greater detail below. A GPS receiver 13 coupled to a GPS interface 14 receives tracking information from at least 3 geostationary satellites 15 so as to determine the vehicle's location in 3-D space. Coupled to the GPS interface 14 is a driving analysis unit 16 that determines the vehicle's speed v based on the difference between successive locations $S_1$ and $S_2$ as measured in a known incremental time $\Delta t$, according to the formula:

$$v = \frac{s_2 - s_1}{\Delta t}$$

Likewise, the driving analysis unit 16 determines the vehicle's acceleration a based on the difference between successive speeds $v_1$ and $v_2$ as measured in a known incremental time $\Delta t$, according to the formula:

$$a = \frac{v_2 - v_1}{\Delta t}$$

The traffic sign database 12 is coupled via a digital map interface 17 together with the output of the driving analysis unit 16 to a profile matching module 18. The output of the digital map interface 17 includes the coordinates (x, y, z, t) in 3-D space of traffic signs. The output of the driving analysis unit 16 includes the coordinates (x, y, z, t) in 3-D space of the vehicle 11 as well as its instantaneous speed (v) and acceleration (a). The current location in space of the vehicle 11 at a known absolute time (t) is signaled by the GPS interface 14 and allows the decision module 20 to compute when an event will occur in time units based on the vehicle's current speed. Thus, as the system knows both the coordinates of the current location of the vehicle and of an upcoming event, it is able to calculate air distance, and since the vehicle speed (v) is also known, the minimum time for the vehicle to reach the traffic sign can be calculated. In other words, the system computes how long it will take the vehicle to reach the event location assuming that the actual road between the current vehicle position and the traffic sign is straight, i.e. that there are no curves or inclines. In such case, the alert zone can be defined in terms of the time to reach the event instead of distance, such that in the example depicted in FIG. 2 the "alert zone" is defined by $t_1$ and $t_0$ instead of $S_1$ and $S_0$, respectively. Thus, for example, an alert may be generated up to approximately one minute before reaching the event. Alternatively, there could be stored in the map database several locations on the road at prescribed distances prior to the sign and having associated therewith predefined speed parameters defining the maximum safe is speed of the vehicle at these points commensurate with safe driving. By way of example, 500 m prior to a dangerous curve there may be placed a marker defining a maximum speed that is commensurate with reaching the curve at a safe speed. If, when the vehicle passes this marker, its speed exceeds the safe speed, then an alert is given.

Figure 2:
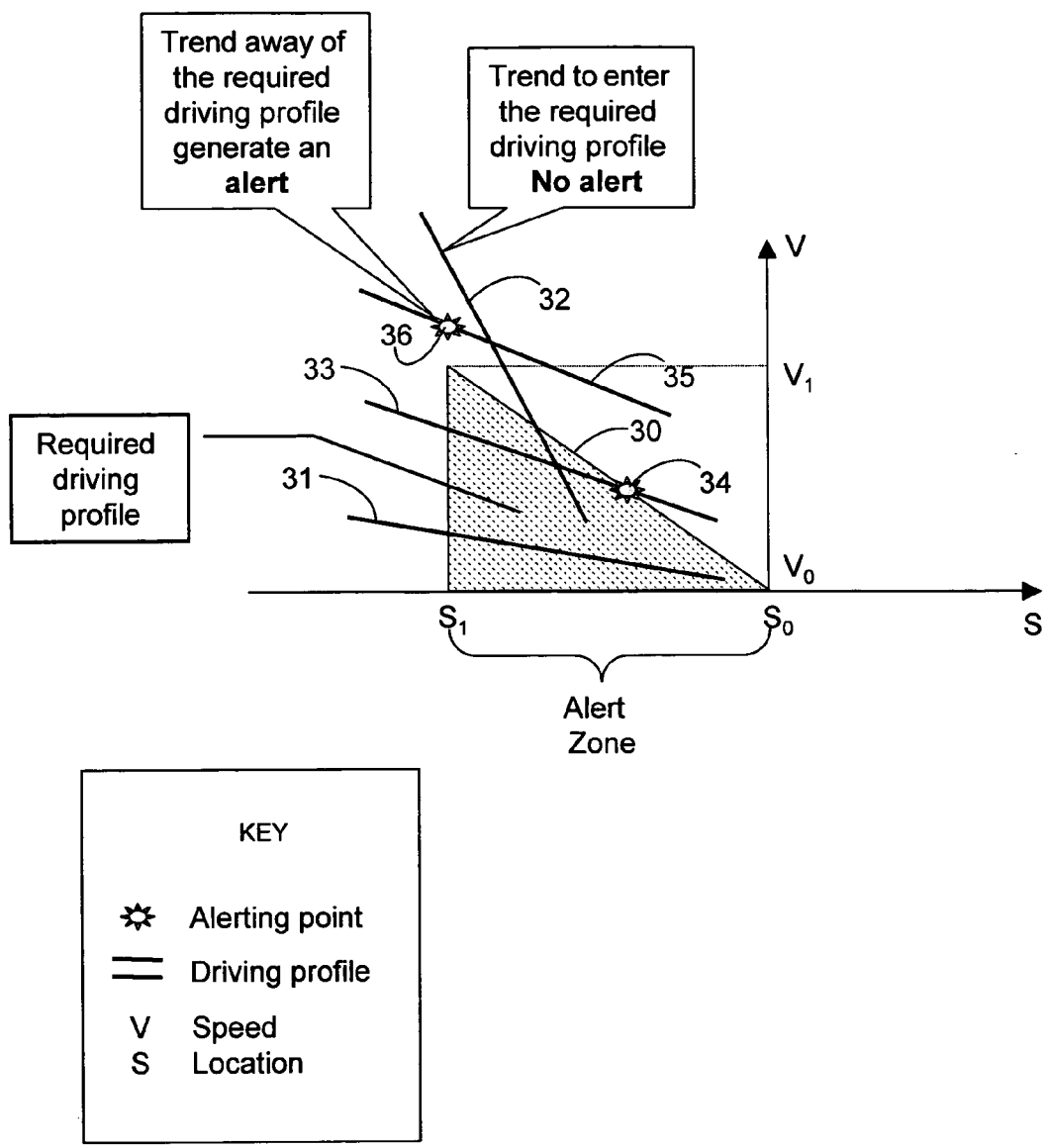
FIG. 2 is a graphical representation showing a driving profile associated with an event such as an upcoming traffic sign used in the system shown in FIG. 1.

FIG. 2 shows graphically an example of alternative approach, where the driving profile database 12b stores a driving profile in association with a stop sign. The driving profile is represented by a continuous profile denoted 30 whereby a marker at $S_1$ defines the beginning of an 'alert zone' that is defined from that marker $S_1$ to the actual sign location $S_0$. Associated with the marker $S_1$ is a definition of the speed $V_1$ at the beginning of the alert zone and a formula that describes the recommended speed and acceleration required from that point $(S_1; V_1)$ to the actual sign location and required speed $(S_0; V_0)$. An alert is generated when the vehicle driving graph departs from the required driving profile with a trend away from it.

Consider, for example, as showed in FIG. 2, a stop sign located at $S_0$ where obviously the required speed at the sign location $S_0$ is 0 km/hr. For the sake of simplicity, FIG. 2 shows graphically a linear speed reduction from $V_1$ at $S_1$ to zero at $S_0$ although it will be appreciated that the profile can contain any kind of acceleration and may also consider adjustments according to factors representing vehicle type, weather, time of the day and so on. Upon passing the marker $S_1$, a vehicle profile is determined based on the initial vehicle speed and acceleration and fitted to the profile 30 in order to predict whether the vehicle profile is commensurate with the vehicle reaching zero speed at the stop sign $S_0$. Thus, vehicle profile 31 is seen to lie within the profile 30 and to intersect the speed axis at $S_0$ and clearly represents a safe profile. Likewise, it is seen that vehicle profile 32 enters the profile 30 at such a steep gradient that the vehicle will clearly come to rest even before the stop sign $S_0$. On the other hand, vehicle profile 33 intersects the profile 30 at a point 34 but its gradient is too gradual to reach zero speed within the alert zone, thus giving rise to an alert at point 34. Vehicle profile 35 never intersects the profile 30 and gives rise to an immediate alert at point 36 corresponding to its speed at the marker $S_1$, which is higher than the ideal safe speed $V_1$ and has too low a deceleration to permit the vehicle to come to rest at the stop sign $S_0$.

The profile matching module 18 extracts data from a driver profile database 19 coupled to the driving analysis unit 16. The driver profile database 19 stores data that is output by the driving analysis unit 16 and that defines the motorist's driving pattern so that warnings can be filtered out in order to avoid presenting warning messages to a motorist whose driving profile indicate that a warning would be unnecessary or premature. Once his driving pattern has been established and stored in conjunction with the profile matching module 18, warnings can be suppressed if necessary. Such suppression is pre-programmed but may also be amenable to modification by the motorist as is explained below. It should be noted that while in FIG. 1 the digital map database 12a, the driving profile database 12b and the driver profile database 19 are shown as separate database, in practice they may be separate tables in a single database stored on a single repository that is commonly accessible to both the digital map interface 17 and the profile matching module 18.

The output of the profile matching module 18 is fed to a decision module 20, which determines whether the motorist's driving pattern is commensurate with an upcoming traffic sign and, if not, outputs a warning signal. For example, if it is determined that in a certain distance there will be a stop sign and the vehicle speed is currently 60 km/h and shows no sign of decelerating, then a warning signal is output by the decision module 20. The warning signal is filtered by a driver pre-defined alert filter 21, which filters out warning signals that the motorist has indicated should be discarded. For example a motorist may decide he wishes the system to discard certain type of signs (e.g. curve signs) or a specific sign in a specific location (he may instruct the system upon receiving an alert to discard this sign in the future) or he may choose one of the system predefined level of alerts (such as critical, recommended or all) where the level is categorized according to police recommendations and accident statistics. The driver pre-defined alert filter 21 gives the motorist the necessary flexibility to program the system to accommodate such personal preferences and, in certain circumstances, to override the profile matching module 18 where, as noted above, suppression of warnings is pre-programmed.

On determining that a warning is required, such warnings may be displayed or vocalized either according to system design or motorist preferences via a Human Machine Interface (HMI) 22 (constituting a warning unit). Data relating to the warnings are stored in a warning messages database 23. For example, informative data such as "traffic lights in 500 meters" may be vocalized and the vocal data stored in the warning database 23 for presenting an audible message to the motorist. Alternatively, the warning message may be presented as a buzzing or visually such as a flashing light or textually, in which case corresponding textual data is stored in the warning database 23.

Coupled to the digital map interface 17 is an RF update module 24 coupled to an RF transceiver 25 that receives map update data, for example from the ordnance department of the ministry of transport. The RF transceiver 25 constitutes a wireless interface that allows the map data to be updated remotely. Alternatively, map update data may be fed to the digital map interface 17 via a digital map interface 26. Such map update data may be provided on a CD-ROM or any other medium such as flash memory or may be accessed via the Internet and downloaded to replace or complement the data in the traffic sign database 12.

The RF transceiver 25 constitutes a wireless interface that allows also any temporary or relevant information to be received and reported by the system. For example, information relating to a temporary obstacle on the road as a result of an accident can be reported to the motorist via the RF transceiver 25. Likewise, the RF transceiver 25 may be used to communicate with other vehicles having RF transceiver 25 within broadcast range. This can allow a motorist to warn other motorists of approaching hazards and is farther reaching than blowing the vehicle's horn.

Optionally, the driving analysis unit 16 may be coupled to or include a vehicle instrumentation unit 26 for feeding current parameters of the vehicle to the decision module 20. The vehicle instrumentation unit 26 may determine the vehicle speed directly from the vehicle speedometer, thus obviating the need to compute it from successive locations of the vehicle as conveyed by the GPS interface 14. It may also provide other vehicle parameters that may influence the decision as to whether to provide a warning, such as ambient road conditions such as wet road surface, visibility, tire pressure and so on.

Figure 3:
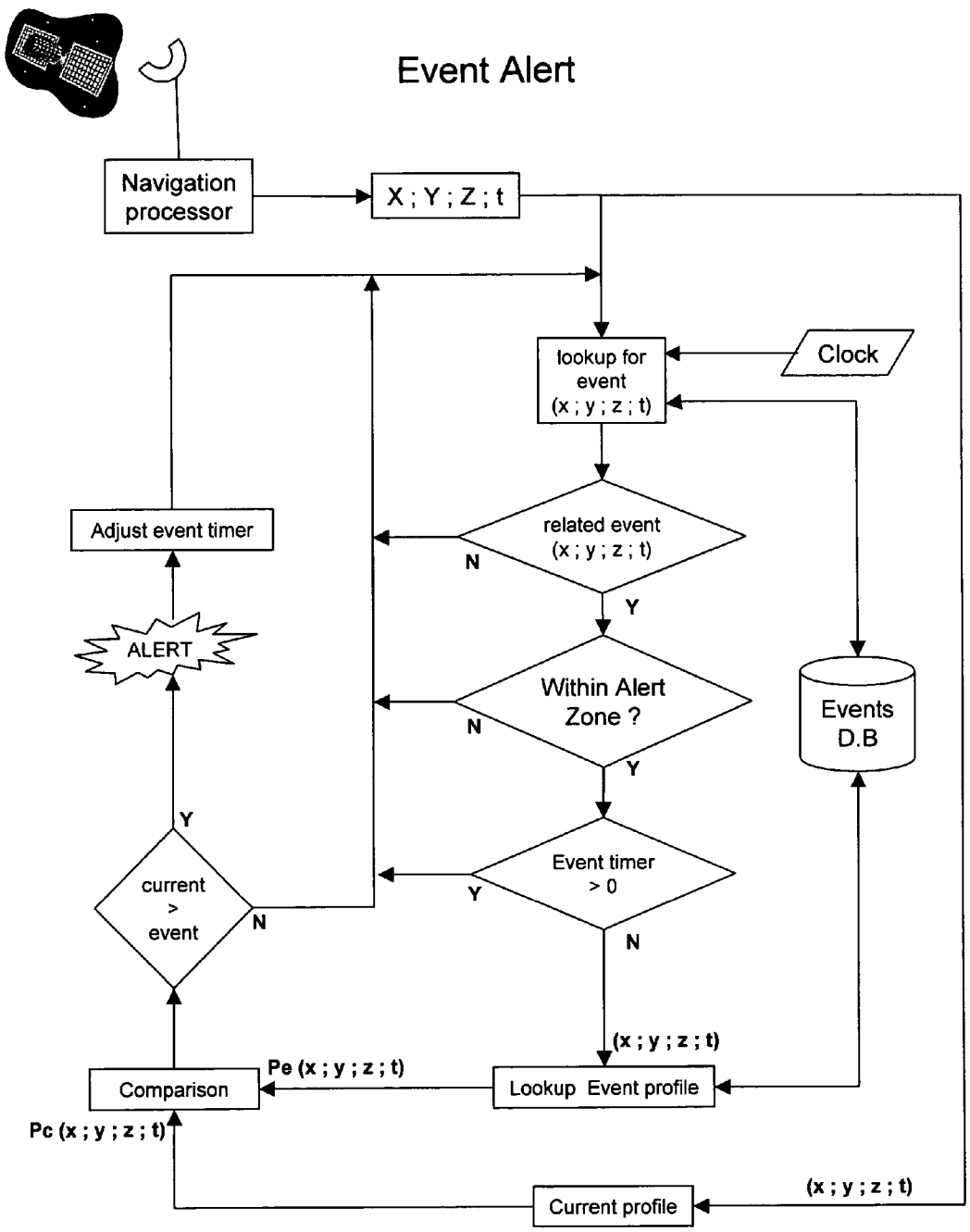
FIG. 3 is a flow diagram showing the principal operations carried out by the system shown in FIG. 1 responsive to an external event such as an upcoming traffic sign.

Reference is now made to FIG. 3 depicting a flow diagram showing the principal operations carried out by the system shown in FIG. 1 responsive to an external event. An event may be constituted, for example, by an upcoming traffic sign, junction or any other event that is pre-defined as requiring a potential alert. Such events are prompted by the (x, y, z, t) coordinates of the instantaneous location of the vehicle output by the GPS interface 14. This information is compared with the events database in order to establish whether an upcoming event of importance is due to occur within a predefined time interval. Upon establishing that an event will occur within a predefined time interval, the system checks whether the event is due to occur within a predefined alert zone. For example, it may not be necessary to alert the motorist of an upcoming traffic light or other road sign that is a certain distance from the vehicle's present location if the vehicle is, in any case, driving in a different direction or is too remote from the traffic sign to warrant a warning at this stage.

If the event is determined to be within the alert zone, an event timer corresponding to this event is tested. The event timer allows a time period between repeat warnings relating to the same hazard to be set and avoids multiple repeat messages pertaining to the same event being presented, which would only bother the motorist. If the event timer is zero (i.e. not set), the event profile extracted from the events database is compared with the current location, acceleration and speed of the vehicle to determine whether the event warrants an alert and, if so, a suitable warning is output. The event timer corresponding to this event is then set to a desired time interval upon expiry of which the same warning is repeated if the circumstances dictate. Thus, for so long as the event timer is non-zero, during subsequent iterations, the event analysis simply loops without comparing the specific event profile to the current location acceleration and speed of the vehicle while the event timer counts down to zero. Only when the event timer reaches zero, is the event profile compared to the current location, acceleration and speed of the vehicle so that repeat warnings are not given corresponding to the same event in a subsequent iteration. As an alternative to the timer, the system can set a flag that allows repeated alerts for the same event to be filtered and which is reset when the vehicle passes the event location.

Figure 4:
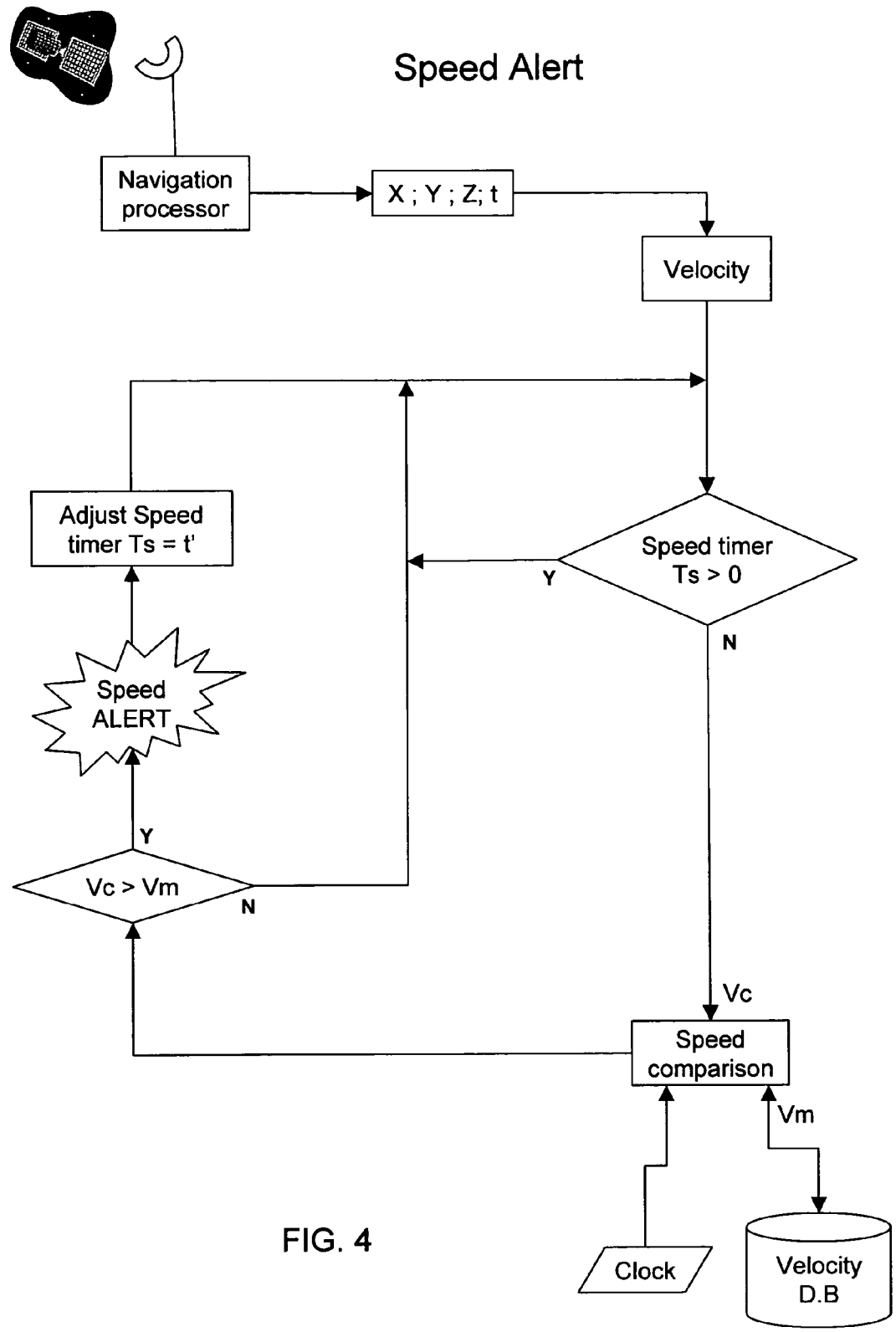
FIG. 4 is a flow diagram showing the principal operations carried out by the system shown in FIG. 1 responsive to a speed alert.

FIG. 4 is a flow diagram showing the principal operations carried out by the system shown in FIG. 1 responsive to a speed alert. In this case, (x, y, z, t) coordinates output by the GPS interface 14 are processed in order to determine the vehicle's speed and if a speed timer $T_s$ corresponding to the vehicle's current speed, is not greater than zero, then the speed is compared with the speed limit at the vehicle's current location denoted Vm as determined from the map database. The speed timer $T_s$ is initialized to zero so that on determining that the vehicle's speed exceeds the maximum permitted speed for the vehicle's current location as determined from the traffic sign database, a corresponding warning message is output. The speed timer $T_s$ is then set to a value t' that corresponds to a predefined alert interval so that during subsequent iterations repeat warning messages may be output at the predefined alert interval or output repeatedly during each subsequent iteration if $T_s$ is set to zero. If the motorist does not wish to receive repeat warnings pertaining to the same speed infringement, the alert interval t' can be set to so large a value that either the vehicle exits a restricted region having a speed limitation, or if the alert interval t' exceeds a given threshold, the warning can simply be suppressed since in any case the motorist is ignoring the speed limitation. On the other hand, Ts can be forced to zero once the vehicle speed has reduced below the speed limit, thereby ensuring that it is initialized either for the next event or if it accelerates beyond the speed limit while still within the limited speed zone.

Modifications will be apparent to those skilled in the art without departing from the scope of the invention as defined by the appended claims. For example, it will be clear that some of the features described above are optional and may be dispensed with in a less flexible, and therefore less expensive, system. These features include the driver predefined alert filter and the RF update module or the digital map interface. It will also be understood that remote updating of the map database may be achieved using other forms of wireless communication other than RF, such as optical, Bluetooth and so on. Likewise, the profile matching module, while clearly beneficial, could be dispensed with in a less versatile system. In similar manner, although the vehicle location system is described as GPS-based, this is considered particularly convenient since it does not depend on alternative systems which typically employ beacons and thus require significant changes to the highway infrastructure. However, it will be clear that any location system will also function with the invention without departing from its generality.

Likewise, although the location determination unit is preferably a 3-D coordinate system, satisfactory operation will often be achieved even when only 2-D location determination unit is available or is deemed more economical, as is currently frequently the case.

Moreover, although in the preferred embodiment, the traffic sign data is stored on-board the vehicle, the map database need not be part of the system 10 but could be coupled thereto via the map interface. The map data could then be obtained from an external source, as described above, and coupled to the system. Alternatively, map data could conceivably be fed externally to the vehicle in real time.

It should also be noted that references to 'traffic sign' are by way of example only and relate to any "event" that may require an alert and that occurs at a location in space that is stored in the map database. Whether or not there is an actual traffic sign at the location, all such events are stored in the 'traffic sign database.'

Likewise, while the invention has been described with particular reference to road traffic signs, it will be understood that the invention may also find application in any transportation route where "events" can be spatially mapped. For example, the invention can be applied to a railway infrastructure, in order to alert the railway driver of dangerous curves or of approaching signals, and so on.

The invention claimed is:

1. An in-vehicle system for tracking events that occur at specific locations of a transportation route and alerting a driver of an impending significant event, the system including:
   a location determination unit for determining an instantaneous location of the vehicle,
   an event determination unit coupled to the location determination unit and responsive to the instantaneous location of the vehicle for communicating with an events database for obtaining an impending event that the vehicle is about to confront based on said instantaneous location,
   a decision module coupled to the event determination unit and responsive to current parameters of the vehicle for determining whether the current parameters of the vehicle are conducive to safe driving based on said impending event, and
   a warning unit coupled to the decision module and responsive to at least one current parameter of the vehicle not being conducive to safe driving based on said impending event for alerting the driver of the impending event.

2. The system according to claim 1, wherein the location determination unit is GPS-based.

3. The system according to claim 1, wherein the event determination unit includes a map interface adapted to be coupled to a map database mapping traffic signs according to their location in 3-D space.

4. The system according to claim 3, further including a map data update module coupled to the map interface for allowing data in the map database to be updated.

5. The system according to claim 4, wherein the map data update module includes a manual interface for allowing data in the map database to be updated manually.

6. The system according to claim 4, wherein the map data update module includes a wireless interface for allowing data in the map database to be updated remotely.

7. The system according to claim 6, wherein the wireless interface is adapted to communicate warnings to proximate vehicles in broadcast range of the wireless interface.

8. The system according to claim 1, further including a profile matching module coupled to the analysis unit that is responsive to data defining a driver's driving pattern so that warnings can be adapted to a learned driver's driving pattern.

9. The system according to claim 1, further including an alert filter for allowing the driver to filters out warning signals that the driver has indicated should be discarded.

10. The system according to claim 1, further including a driving analysis unit coupled to the decision unit for feeding instantaneous vehicle location, speed and acceleration to the decision module.

11. The system according to claim 10, wherein the driving analysis unit is adapted to compute instantaneous vehicle speed and acceleration from successive locations of the vehicle received in a known time interval.

12. The system according to claim 10, wherein the driving analysis unit is coupled to a vehicle instrumentation unit for deriving vehicle parameters that may influence the decision as to whether to provide a warning.

13. The system according to claim 1, wherein the warning unit is adapted to render warning messages vocally.

14. The system according to claim 1, wherein the warning unit is adapted to render warning messages visibly.

15. The system according to claim 1, wherein the events database includes both spatial coordinates of an event and time data relating to time restrictions associated with the event.

16. The system according to claim 1, wherein the events database includes data relating to markers that are associated with actual events in the events database and serve to provide the driver with advance notice of said event.

17. The system according to claim 16, where in respect of said markers the events database includes data defining a speed threshold that may not be exceeded.

18. The system according to claim 17, wherein the data relating to said markers includes a driving profile represented by a continuous profile defined by an initial marker ($S_1$) depicting commencement of an alert zone and having associated therewith a definition of a safe speed ($V_1$) at the commencement of the alert zone and a formula that describes a safe acceleration profile from the commencement of the alert zone to termination of the alert zone.

19. The system according to claim 18, wherein the alert zone is defined spatially in terms of distance between the marker and an associated event.

20. The system according to claim 18, wherein the alert zone is defined temporally in terms of time taken to reach an event from an associated marker based on speed and acceleration of the vehicle at the marker.

21. The system according to claim 1, wherein the event is an upcoming traffic sign.

22. A method for alerting a driver of an impending significant event that occurs at a specific location of a transportation route, the method including:
   determining an instantaneous location of the vehicle;
   accessing an events database for obtaining an impending event that the vehicle is about to confront based on said instantaneous location;
   determining whether the current parameters of the vehicle are conducive to safe driving based on said impending event; and
   if at least one current parameter of the vehicle is not conducive to safe driving based on said impending event, alerting the driver of the impending event.

23. The method according to claim 22, further including learning a driver's driving pattern so that warnings can be adapted to a learned driver's driving pattern.

24. The method according to claim 22, further including filtering out warning signals that the driver has indicated should be discarded.

25. The method according to claim 22, further including:
   obtaining data relating to markers that are associated with actual events in the events database;
   upon passing a marker, obtaining data defining a speed threshold that may not be exceeded;
   comparing an instantaneous speed of the vehicle with said speed threshold; and
   if the instantaneous speed of the vehicle exceeds said speed threshold, alerting the driver.

26. The method according to claim 22, further including:
   obtaining data relating to a marker that is associated with actual events in the events database and denotes commencement of an alert zone and has associated therewith a definition of a speed ($V_1$) at the commencement of the alert zone and a formula that describes a safe acceleration profile from the commencement of the alert zone to termination of the alert zone;
   upon passing a marker, predicting from an instantaneous speed and acceleration of the vehicle whether the vehicle is conducive to safe driving; and
   if the vehicle is not conducive to safe driving, alerting the driver.

27. The method according to claim 22, wherein the event is an upcoming traffic sign.

* * * * *